United States Patent [19]

Yakuwa et al.

[11] Patent Number: 4,775,957
[45] Date of Patent: Oct. 4, 1988

[54] MICROCOMPUTER WITH ABNORMALITY SENSING FUNCTION

[75] Inventors: Masahiko Yakuwa, Wako; Kikuo Tomozawa, Minato, both of Japan

[73] Assignee: Honda Giken Kogyo K.K., Tokyo, Japan

[21] Appl. No.: 945,786

[22] Filed: Dec. 23, 1986

[30] Foreign Application Priority Data

Dec. 28, 1985 [JP] Japan .............................. 60-299053

[51] Int. Cl.4 ............................................ G06F 11/34
[52] U.S. Cl. ...................................... 364/900; 371/62
[58] Field of Search ... 364/200 MS File, 900 MS File, 364/184, 186; 371/14, 62

[56] References Cited

U.S. PATENT DOCUMENTS

| | | | |
|---|---|---|---|
| 4,072,852 | 2/1978 | Hogan et al. | 364/900 |
| 4,162,526 | 7/1979 | Gass et al. | 364/200 |
| 4,538,273 | 8/1985 | Lasser | 371/62 |
| 4,586,180 | 4/1986 | Anders et al. | 371/14 |
| 4,598,355 | 7/1986 | Shepler et al. | 364/186 X |
| 4,618,953 | 10/1986 | Daniels et al. | 371/62 X |
| 4,627,060 | 12/1986 | Huang et al. | 371/62 |

*Primary Examiner*—Thomas M. Heckler
*Attorney, Agent, or Firm*—Arthur L. Lessler

[57] ABSTRACT

A microcomputer includes an interrupt signal generator for supplying a CPU with an interrupt signal at predetermined time intervals, and a monitoring timer reset by a reset signal generated by the CPU in response to the interrupt signal. An abnormality is sensed on the basis of expiration of time in the monitoring timer. A flag for resetting the monitoring timer during a first processing started by the interrupt signal is stored in a memory device connected to the CPU, and the CPU generates the reset signal in response to the stored flag during a second processing having a priority lower than that of the first processing.

5 Claims, 2 Drawing Sheets

MICROCOMPUTER WITH ABNORMALITY SENSING FUNCTION

BACKGROUND OF THE INVENTION

This invention relates to a microcomputer for control purposes. More particularly, the invention relates to such a microcomputer provided with a function for sensing an abnormality in the execution of a control program if an abnormality should occur.

A microcomputer for control purposes is generally adapted to read a plurality of control programs stored in a memory circuit from the memory to a central processing unit (hereafter referred to as a "CPU") through a data bus in a predetermined sequence so that the programs may be executed by the CPU in the predetermined sequence. However, there are occasions where the programs fails to be executed in the predetermined sequence, as in the event of occurrence of noise or some other disturbance.

Microcomputers developed to deal with this situation exist and are equipped with a monitoring timer, or so-called "watchdog timer", for monitoring execution of control programs at all times to determine whether the programs are being run correctly. In a microcomputer of this type, the arrangement is such that the monitoring timer is reset in response to an interrupt signal generated by a timer for interrupt processing. If the interrupt signal fails to be generated, the monitoring timer will not be reset and will run out of time. When this occurs, the microcomputer deems that an abnormality such as runaway of the CPU has developed, and the design is such that the CPU is restarted and a warning is issued or, alternatively, such that a back-up circuit is started.

However, malfunctions can occur in which the interrupt processing is executed in an incessant or freguent manner due to a fault in the CPU interrupt timer or superposition of noise upon the interrupt signal, or in which a loop that includes the monitoring timer reset instruction is rendered endless. In the event of malfunctions such as these, the monitoring timer will be continuously reset and will never run out of time though the malfunctions exist, thus failing to execute the above-mentioned fail-safe functions, etc.

SUMMARY OF THE INVENTION

It is therefore an object of the invention to provide a microcomputer with an abnormality detection function the precision whereof is improved by adapting the microcomputer so as to cope even with such malfunctions in an interrupt timer, etc. as generation of an interrupt signal in incessant or frequent fashion.

According to the present invention, the foregoing object is attained by providing a microcomputer including:

a central processing unit;

a memory device connected to the central processing unit; and a monitoring timer arranged to be reset by a reset signal generated by the central processing unit and for sensing an abnormality on the basis of expiration of time in the monitoring timer.

The microcomputer according to the invention is characterized by an improvement wherein:

the central processing unit executes a first processing started in response to an interrupt signal and a second processing having a priority lower than that of the first processing;

the central processing unit sets a flag to a predetermined value and stores the set flag in the memory device during the first processing; and the central processing unit generates the reset signal when it detects that the stored flag has the predetermined value, during the second processing.

The microcomputer may include an interrupt signal generator for generating an interrupt signal at predetermined time intervals and supplying same to the central processing unit whereby the central processing unit generates a reset signal in response to the interrupt signal. The first processing is started in response to the interrupt signal, and the second processing has a priority lower than that of the first processing started by the interrupt signal.

Thus, in the event that the interrupt signal is generated in an incessant or frequent manner due to a malfunction in the interrupt signal generating circuit or the influence of noise, the reset signal for resetting the monitoring timer is not generated so that expiration of time takes place in the monitoring timer and hence the abnormality can be sensed. This makes it possible to improve the precision with which abnormalities are sensed.

The above and other objects, features and advantages of the invention will be apparent from the following description taken in conjunction with the accompanying drawings.

DETAILED DESCRIPTION

A preferred embodiment of a microcomputer in accordance with the invention will now be described with reference to the accompanying drawings.

Figure 1:
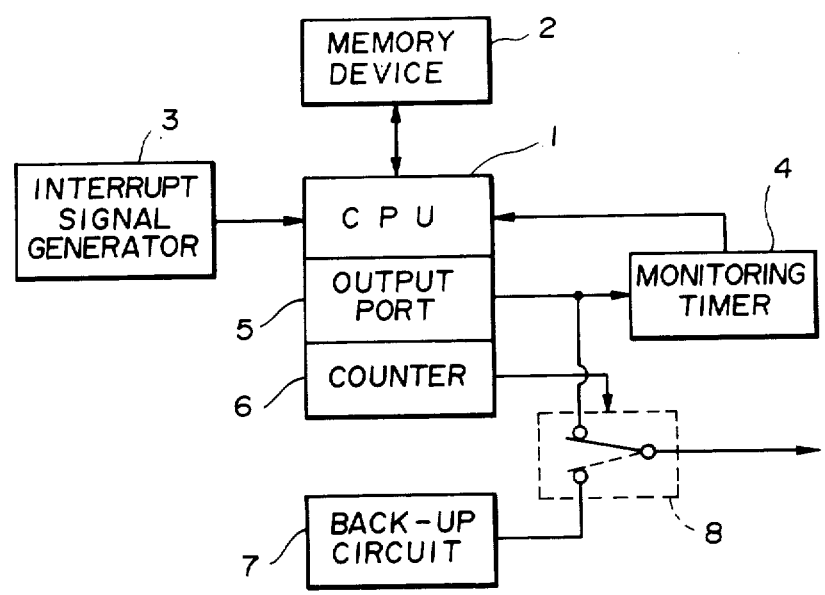
FIG. 1 is a block diagram illustrating the principle components of a microcomputer according to an embodiment of the present invention.

FIG. 1 is a block diagram illustrating the basic construction of the inventive microcomputer installed in a system such as an automotive vehicle controlled thereby. The microcomputer includes a CPU 1 having a memory device 2 connected thereto for storing control programs executed by the CPU 1 as well as various data. The microcomputer further includes an interrupt signal generating circuit 3 comprising e.g. an interrupt processing timer for generating an interrupt signal at predetermined time intervals (e.g. every 10 ms). This signal is delivered to the CPU 1. The latter ordinarily executes programs for fuel pump control for an engine installed in the vehicle, display activation control in the vehicle, and the like, as will be described in detail below. In response to the aforementioned interrupt signal, however, the CPU 1 interrupts the processing of these programs at predetermined time intervals to perform engine control having a higher priority to the fuel pump control, display activation control and the like, such as control of exhaust gas recirculation (EGR) and feedback control of the idling rotational speed of the engine.

Connected to the CPU 1 through an output port 5 is a monitoring timer 4 which is reset by a reset signal outputted from the CPU 1 at a step 13 in the flowchart of FIG. 3, hereinafter referred to. The monitoring timer 4 is adapted to run out of time upon elapse of a predetermined time period (e.g. 60 ms) which starts at the moment the timer 4 is reset. When the time runs out, the timer 4 outputs a reset signal to the CPU 1 to reset (restart) the same. The reset signal from the CPU 1 is generated each time the aforementioned interrupt signal is generated when no abnormality condition prevails, and therefore normally the monitoring timer 4 does not run out of time and accordingly the CPU 1 is not reset. When an abnormal condition continues to prevail even though the CPU 1 has been reset, the monitoring timer 4 will again run out of time and, hence, the CPU 4 will again be reset. Also connected to the CPU 1 via the output port 5 is a counter 6 for counting the number of times the CPU 1 is reset. When the number of times the CPU 1 is reset exceeds a predetermined number, the counter 6 regards this as indicating a hardware malfunction and causes subsequent control to be switched over to a back-up circuit 7 which supplies a temporary signal substituted for the output signal from the CPU 1 via switching means 8.

It should be noted that a digital timer can also be employed as the monitoring timer 4. However, since there is a possibility that such a digital timer will malfunction or incorrectly count due to superposition of noise upon an input signal thereto, use of a known analog timer is preferred.

Figure 2:
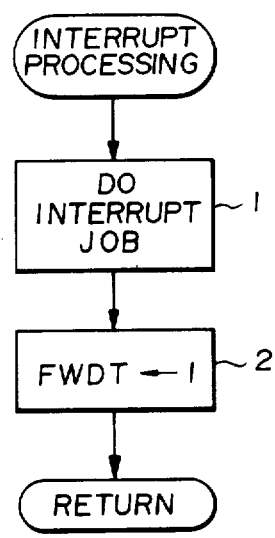
FIG. 2 is a flowchart illustrating an interrupt processing program executed by a central processing unit (CPU) in FIG. 1.

FIG. 2 is a flowchart illustrating a program for higher priority interrupt processing, such as exhaust gas recirculation control. An interrupt job, namely exhaust circulation control, is executed by the CPU 1 at a step 1 of the flowchart in response to an interrupt signal issued by the interrupt signal generating circuit 3 at the predetermined time intervals. A flag FWDT that is stored in the memory device 2 is read out by the CPU 1, set to logical "1", and again stored into the memory device 2 at a step 2 of the flowchart, after which the present program is ended.

Figure 3:
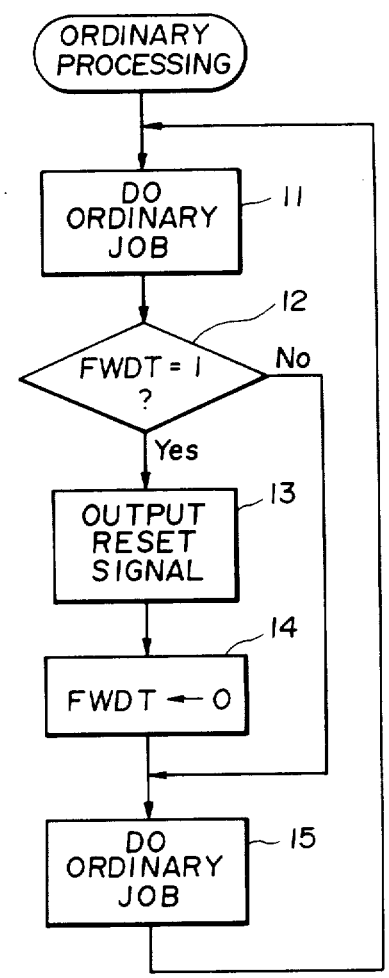
FIG. 3 is a flowchart illustrating an ordinary processing program also executed by the CPU.

The flowchart of FIG. 3 indicates an ordinary processing program for fuel pump control and the like having a lower level of priority. When the interrupt processing program of FIG. 2 is not being run within the CPU 1, the program of FIG. 3 is executed as e.g. background processing which is executed when no interrupt processing is effected. First, at a step 11 of the flowchart of FIG. 3, the CPU 1 performs an ordinary job such as controlling the fuel pump. This is followed by a step 12, which calls for the CPU 1 to determine, during execution of the ordinary job, whether the flag FWDT stored in the memory device 2 has been set to "1". If the answer is YES, the program proceeds to the aforementioned step 13, at which the CPU 1 outputs the reset signal through the output port 5 to reset the monitoring timer 4, and thence to a step 14, at which the flag FWDT is reset to logical "0". This is followed by a step 15, at which the ordinary job is executed again. If a NO answer is received at the step 12, namely if the flag FWDT is "0", then the ordinary job is resumed at the step 15 without resetting the monitoring timer 4.

In accordance with the foregoing arrangement, the flag FWDT in memory device 2 is set to "1" and the reset signal is applied to the monitoring timer 4 by the CPU 1 whenever the interrupt processing of FIG. 2 is executed at the predetermined time intervals during the course of execution of the ordinary processing shown in FIG. 3. If interrupt processing fails to be executed because the interrupt signal is not generated due to malfunctioning of the interrupt signal generating circuit 3 or other causes, the flag FWDT remains in the reset state after being reset to "0" at the step 14 of FIG. 3; hence, the reset signal is no longer outputted to the monitoring timer 4. As a result, the monitoring timer 4 runs out of time and the CPU 1 is reset.

If the interrupt signal generating circuit 3 malfunctions or noise is superposed on the interrupt signal so that interrupt processing is executed incessantly or frequently without a return to the ordinary processing of FIG. 3, the flag FWDT stored in the memory device 2 is set to "1" continuously at the step 2 in FIG. 2. However, since the ordinary processing of FIG. 3 is not executed, the reset signal is not produced from the CPU 1 for the monitoring timer 4. This is because the steps 12 and 13 in FIG. 3 are not executed. The result is that the monitoring timer 4 runs out of time to cause the CPU 1 to be reset.

As set forth above, according to the invention, the flag FWDT for resetting the monitoring timer 4 in the course of a processing started in response to the interrupt signal is stored in the memory device 2, and the CPU 1 generates the monitoring timer reset signal in response to the stored flag during a processing having a priority lower than that of the processing based on the interrupt signal. Accordingly, if the interrupt signal is generated continuously because of a malfunction in the interrupt signal generating circuit 3 or the presence of noise or a like cause, the abnormality can be sensed. Thus, the precision of overall abnormality detection is improved.

Although in the foregoing embodiment a separate interrupt signal generating circuit 3 is connected to the CPU 1, a program may be executed by the CPU for generating an interrupt signal equivalent to the interrupt signal from the circuit 3.

As many apparently widely different embodiments of the present invention can be made without departing from the spirit and scope thereof, it is to be understood that the invention is not limited to the specific embodiments thereof except as defined in the appended claims.

What is claimed is:

1. In a microcomputer including:
   a central processing unit;
   a memory device connected to said central processing unit; and
   a monitoring timer arranged to be reset by a reset signal generated by said central processing unit and for sensing an abnormality on the basis of expiration of time in said monitoring timer;
   the improvement wherein:
   said central processing unit executes a first processing started in response to an interrupt signal and a second processing having a priority lower than that of the first processing;
   said central processing unit sets a flag to a predetermined value and stores in said memory device said set flag, during said first processing; and
   said central processing unit generates said reset signal when it detects that the stored flag has said predetermined value, during said second processing.

2. A microcomputer as claimed in claim 1, wherein the central processing unit sets said flag to a second predetermined value which causes inhibiting generation of said reset signal after the generation of said reset signl, during said second processing.

3. A microcomputer as claimed in claim 1, wherein said monitoring timer generates a second reset signal and supplies same to the central processing unit when said expiration of time takes place in said monitoring timer, and said central processing unit is reset by said second reset signal.

4. A microcomputer as claimed in claim 3, including a counter for counting the number of times said central processing unit is reset in response to said second reset signal, a back-up circuit for supplying an output signal substituted for an output signal from the central processing unit, and switching means, and wherein said counter causes said switching means to switch subsequent control over to said back-up circuit when it counts the number of times said central processing unit is reset, up to a predetermined number.

5. In a microcomputer including:
a central processing unit;
a memory device connected to said central processing unit;
an interrupt signal generator for generating an interrupt signal at predetermined time intervals and supplying same to said central processing unit whereby said central processing unit generates a reset signal in response to said interrupt signal; and
a monitoring timer arranged to be reset by said reset signal generated by said central processing unit and for sensing an abnormality on the basis of expiration of time in said monitoring timer;

the improvement wherein:
said central processing unit executes a first processing started in response to said interrupt signal and a second processing having a priority lower than that of the first processing;
said central processing unit sets a flag to a predetermined value and stores in said memory device said set flag, during said first processing; and
said central processing unit generates said reset signal when it detects that the stored flag has said predetermined value, during said second processing.

* * * * *